(12) United States Patent
Ickinger

(10) Patent No.: US 6,875,298 B2
(45) Date of Patent: Apr. 5, 2005

(54) PROCESS FOR MANUFACTURING MOLDED ARTICLES PROVIDED WITH CAVITIES

(75) Inventor: Georg Michael Ickinger, Graz (AT)

(73) Assignee: Sulzer Chemtech AG, Winterther (CH)

( * ) Notice: Subject to any disclaimer, the term of this patent is extended or adjusted under 35 U.S.C. 154(b) by 408 days.

(21) Appl. No.: 10/164,547

(22) Filed: Jun. 7, 2002

(65) Prior Publication Data

US 2002/0157758 A1 Oct. 31, 2002

Related U.S. Application Data

(62) Division of application No. 09/462,196, filed as application No. PCT/DE98/02205 on Jul. 29, 1998, now Pat. No. 6,447,627.

(30) Foreign Application Priority Data

Jul. 29, 1997 (AT) .............................................. 1284/97

(51) Int. Cl.⁷ .......................... B32B 3/12; B32B 31/20; B32B 31/26
(52) U.S. Cl. ........................ 156/197; 156/77; 156/245; 264/45.1; 264/53; 264/54; 264/464; 264/478; 264/480
(58) Field of Search ...................... 156/77, 197, 244.11, 156/245; 264/45.1, 53, 54, 219, 464, 478, 480

(56) References Cited

U.S. PATENT DOCUMENTS 3,615,972 A 10/1971 Morehouse, Jr.
4,247,586 A 1/1981 Rochlin
4,397,799 A 8/1983 Edgren et al.
4,582,224 A 4/1986 Proksa et al.
4,749,554 A 6/1988 Proksa et al.
4,843,104 A 6/1989 Melber et al.
4,917,502 A 4/1990 Proksa et al.
5,244,613 A 9/1993 Hurley et al.
5,766,719 A 6/1998 Rimkus

FOREIGN PATENT DOCUMENTS

| EP | 0 137250 | 5/1989 |
| EP | 0 679501 A1 | 11/1995 |
| JP | 02178012 | 12/1988 |
| JP | 10006363 | 6/1996 |

OTHER PUBLICATIONS

WO 99/06200—International Search Report, 3 pages, dated Feb. 11, 1999—Title: "Process for Manufacturing Moulded Articles Made of Plastics, Cellulose or Wood Pulp and Provided with Cavities".

Primary Examiner—Sam Chaun Yao
(74) Attorney, Agent, or Firm—Francis C. Hand; Carella, Byrne, Bain, etal

(57) ABSTRACT

Process for manufacturing molded articles made of plastics, cellulose, pulp or wood fibers with cavities, in particular composite parts for light weight construction, by means of tool parts, including the following process steps: a) matrix layer is provided at pre-selected locations with inserts containing gas-creating substances or blowing agents and b) these inserts are activated to create gas in tool parts and thus expand the matrix material. Also disclosed are gas-creating insertion elements for use in the process and made of gas-creating blowing substances enclosed in gas-proof sheaths or inserted into the matrix material in order to form locally limited areas. This process allows the production of particularly light and at the same time solid tool parts, in particular composite parts for light-weight construction.

8 Claims, 22 Drawing Sheets

PROCESS FOR MANUFACTURING MOLDED ARTICLES PROVIDED WITH CAVITIES

Figure 1A:
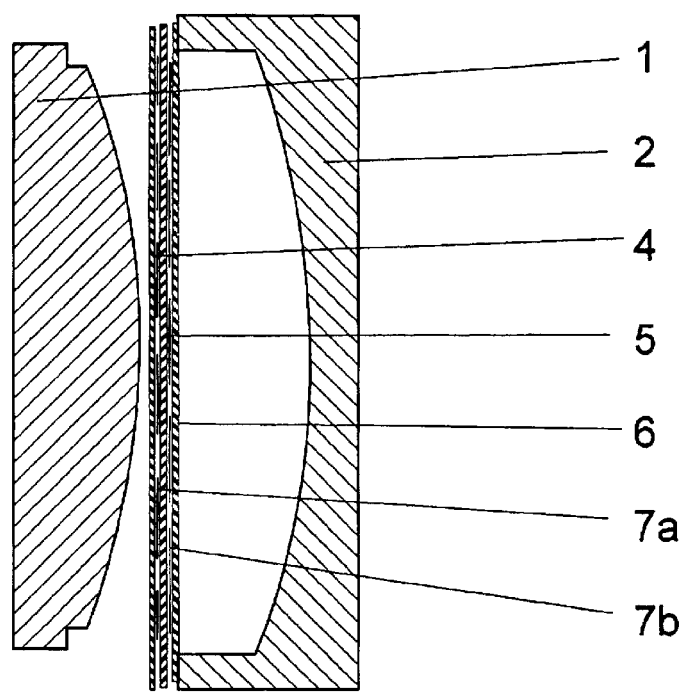
Figure 1B:
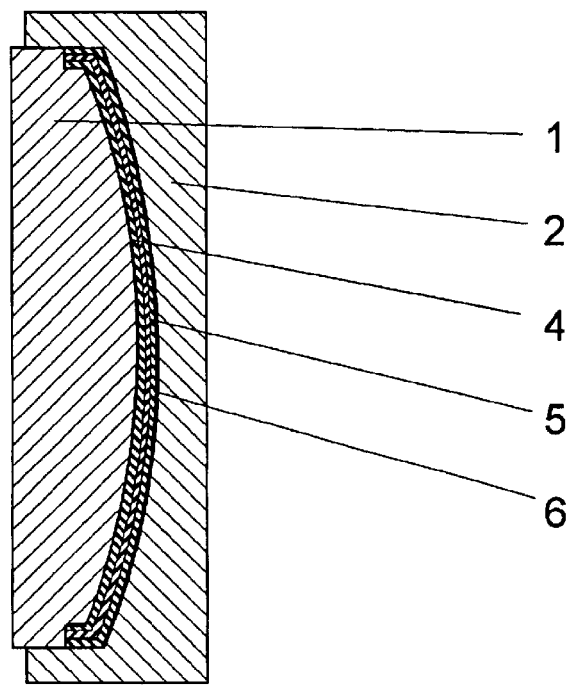
Figure 1C:
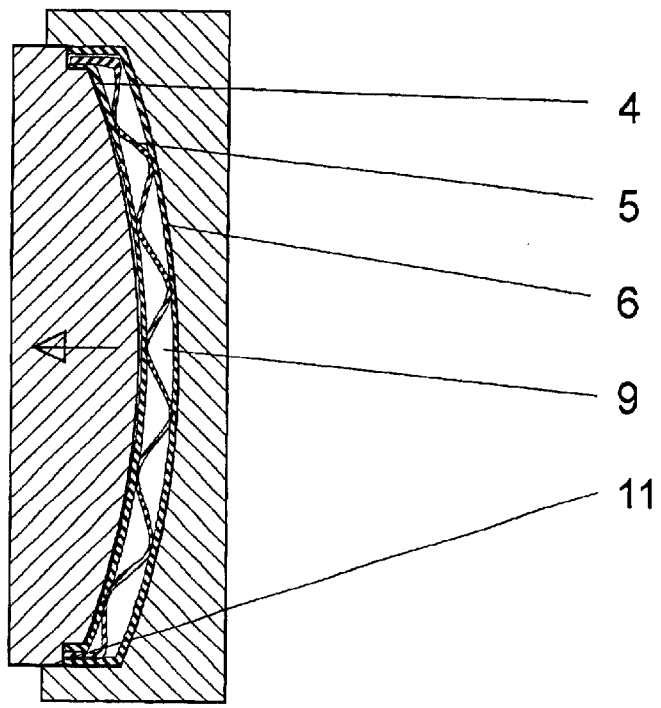
Figure 1D:
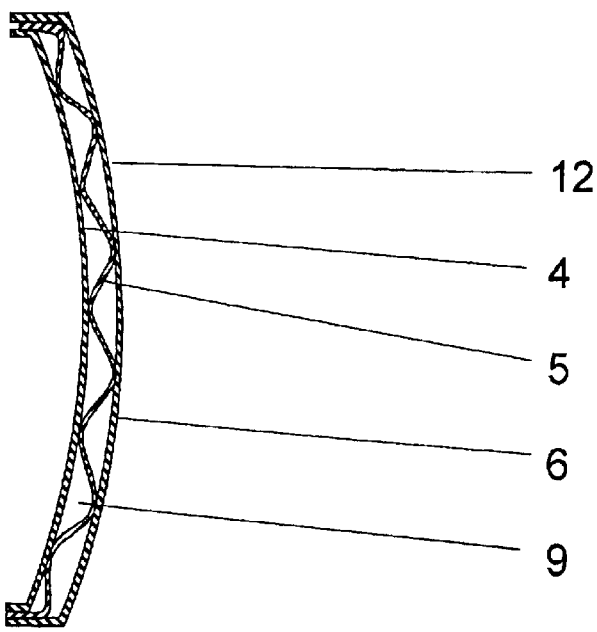

"This application is a division of application Ser. No. 09/462,196, filed Jan. 3, 2000, now U.S. Pat. No. 6,447,627 which is a 371 of PCT/DE98/02205, filed Jul. 29, 1998.

DESCRIPTION

The invention concerns a procedure for the production of structured parts with cavities consisting of plastics, cellulose or wood granulate, in particular of light-weight construction compound parts, using molding tools. Gas-creating insertion elements are also used in the procedure.

The European patent EP 0 478 535 [B1] already contains a description of plastic-coated parts such as pressure pads and rolls, whereas a further layer for the reduction or removal of adhesion is applied between the part and the epoxy coating in a locally limited procedure. To create cavities in the layer, the layer is filled with fluids or gas, through which the epoxy coating will arch outwards. Consequently, the surrounding area of a roll can be deformed in a desired manner depending on order and size of the cavities.

The German patent application DE 33 24 705 A1 describes a procedure for the production of a sound-absorbing lining with cavities which is made of textiles; this lining is preferably used for the construction of vehicles in order to line sound-sensible fields on the one hand and protect against airborne sound on the other hand. The lining consists of at least two mats that are made of textiles, for example reprocessed wool, that have been fabricated with a binding agent at raised temperature. A plastic part, i.e. a continuous tape, is inserted between the mats. The individual layers are then shed with needles and pressed together. In certain areas, the mats and the continuous tape will be pressed more strongly than in others. During the pressing procedure, the plastic part will melt or create gas at the processing temperature; as a consequence, cavities are created in the areas with smaller compression. The areas with higher compression serve as bindings to stiffen the mats. Furthermore, the mats will be combined area by area by binding agents which become effective under the heat and thus the mat will be bound. The plastic parts are preferably made of polystyrol foam, e.g. of thermoformable plastics or other epoxies with low melting temperature.

The composite material described in the European patent application EP 0 679 501 A1 is particularly known for its use in the production of sealing materials in automobile technology which are used for sealing cavities. This composite material consists of a cavity forming supporting material which again contains a "hot-foaming" material. Hot-foaming means that such a material (e.g. polymerics or copolymers of ethylene and unsaturated acrylic esters) will transform at least partly when they are heating up. The temperature of the supporting material, e.g. with polyamide plastic components, is higher than the temperature at the beginning of the foaming process. The composite material is always fabricated in pre-selected forms; afterwards the form will be placed in an installation site designed for the sealing process. For this procedure, the supporting material has to have at least one, preferably two oppositely arranged apertures, through which the foaming material will exit after the activation; the foam will consequently seal the composite material with the walls. An example for the production procedure of composite material parts would be the extrusion of hot-foaming material between two polyamid foils. The composite material parts are then punched into the pre-selected form, thus combining the two external structures.

The support material will not deform during the production process, it will only lead the foam leaking out through the cavities towards the sealing areas.

Furthermore, there is a process for reaction plastics injection molding as described in the German Disclosure DE-OS 1 926 688 which has been developed for the production of a mold part with a dense outer layer made of a polyurethane thermoset. The tool parts are used in automobile technology and household appliance industry, where big-size high-quality tool parts with thick cross sections required. The reaction plastics injection molding of foaming polyurethane thermoset takes place in a mold with core parts. The core is formed by an elastic wrapper with a cylinder-shaped opening and is filled with a gas or a liquid.

As described in the European Patent Application EP 0 443 364 A2, there is a laminated plastic which consists of stable fixings in a foaming or honeycomb core layer made of a temperature-resistant epoxy. In the core layer, foaming inserts that have a higher density than the core layer are placed near the fixing places. The core layer is coated with at least one layer of a fiber-reinforced temperature-resistant epoxy. Such laminated plastics are preferably used for the construction of interior parts for airplanes. An example for the incorporation of the inserts into the core layer would be the shaping of hollows into the core layer, and inserting a granular material blowing agent. The foaming granular material enters into the core layer and anchors there. Self-cutting tapped bushings can then be screwed into the insert. The blowing agents are used for foaming an epoxy in order to create a foam with high density.

The U.S. Pat. Ser. No. 4,113,909 also specifies the production of hexagonal structures of a plastomer to be used in light-weight building boards. A plate of the thermoplast is inserted between two molding boards, then heated up; afterwards the boards are drawn apart. Hereby the thermoplast form, now in heated condition, sticks to the molding boards and the drawn-apart thermoplast material forms a honeycomb structure.

The present invention aims at developing a procedure to manufacture particularly light, but at the same time solid, molding tools, in particular of light-weight construction compound parts.

This goal can be achieved through a procedure for manufacturing structured parts with cavities consisting of plastics, cellulose or wood granulate, in particular to form light-weight compound parts making use of tool parts following the features disclosed in the present invention.

The said procedure for the production of structured parts with cavities made of plastics, cellulose or wood granulate using tool parts allows an expansion of the matrix material by inserting pre-shaped gas-creating substances in the matrix material at pre-selected places, and subsequently activating the insertion elements in the tool parts to produce gas, thus creating light-weight macro-cavities, which are preferably filled only with gas and the residue of the blowing agent and not with heavy foam.

The present invention extends the state of the art by offering the possibility to create several, but separately structured macro-cavities inside a matrix material without external gas conduction, which will preferably lead to a honeycomb structure formation with a homogeneous combination with the surface layers.

The said insertion elements which consist of gas-creating substances and a surrounding or solid coating, will be applicated to fiber webs in the form of circular, polygon or ring-shaped discs and implemented as single parts between at least two of the pre-fabricated layers of plastic, wood, or granulated material in double-sided films; these pre-fabricated layers are then inserted into the mold and subsequently coated by injection molding or extrusion or pressing to a homogeneous compound ready to be triggered for gas creation on the implemented inserts for lift-off in order to create the hollow structure.

A further possibility for the stationary fixing of the insertion elements would be the use of textile inserts. During the weaving process, the weaving machine pointedly places the insertion elements in the programmed pattern.

Multiple-staged weaving machines will insert the gas-creating substances in the said offset pattern in two layers. The prefabricated weavings with the included insertion elements positioned in the mold and the left cavity of the mold are filled by injected plastics. The subsequent creation of gas causes a tension of the reinforcement until the yielding point is reached. Due to the reinforcement, the compound part will be of greater solidity.

The submitted procedure makes it possible to coat light-weight structures with cavities in an economic process by inserting foils or a decor film inside the mold surfaces. These light-weight construction compound parts have a high specific strength-weight relation and are especially suited for cladding, covers and crash-proof parts in car, ship and airborne vehicle design. Using reinforced sheets of plastics or sheet steels as surface layers, high-strength structural parts are set up. In addition to good sound and heat insulation through the cavities, the thickness of the structure walls can be held small. Three-dimensionally shaped hulls that are homogeneously bound with the matrix on the surface layers form a stable compound; furthermore, the cavities can be used to implement hollow elements including pipes and cables as single-double corrugated structures.

The presented invention differs from existing hot-foaming processes and foaming material inside hollow structures by the following features.

The local situation of the cavities is predetermined by the situation of the insertion elements.

The cavity size lies in the macro-area and is predetermined by the size of the insertion elements.

The structured compound from the thin-walled encirclement of the cavities by the matrix material, as well as the combination of the bordering surface layer consists of a supporting homogenously bound matrix material.

The design of the thickness of the matrix material walls, the form and size of the cavities, are predetermined by form and situation and the amount of blowing agent; and are arranged according to static requirements.

The structured compound is arranged according to the direction of the form of the insertion elements and their size in accordance to the loads of the part.

The gasification and therefore the creation of cavities will preferably occur in a predetermined manner and in locally limited areas. The blowing agent substances will be activated after the local thermoplastic deformation of the pre-form and hot tack adhesion of layers or pre-formed layers in order to create the macro-cavities e.g. for a light-weight compound, web systems, isolation cavities etc.

The method for the punctual ignition of the gas-creating process of insertion elements imbedded in a matrix material of plastics, cellulose or wood granulate will preferably be applied according to the following features:

Exothermic Processes:

Transgression of a certain pressure which is necessary for gasification,
  by injecting (molding) additional matrix material,
  by pressing and compressing a form, Transgression of a certain temperature which is necessary for gasification,
  by external additional warming such as radiation or convection,
  by rubbing the particles by means of pressure or shifting,
  by the friction of films and the resulting contact friction energy, microwave radiation, ultrasound, energetic radiation from outside;

Endothermic Processes:

the mechanical mixing of gas- or heat-creating components using external pressure or shifting, thermal melting of substances coated by protective layers with gas or heat-creating substances with at least two components resulting in a subsequent reaction, the bursting of covers of included substances and their resulting reaction, the diffusion of two gas-creating substances which are separated by a porous film which, for the ignition/activation, will penetrate the film and then react Time-delayed Processes:

chemical reaction with determined delay, attaining a certain mass by compression in order to trigger the gas- or heat-creating reaction;

triggering the reaction by placing additives of endotherm processing material

Combination of the Previously Mentioned Processes.

The processes of exothermic gasification are preferably combined by creating heat within the matrix material layer. The exothermic reaction softens the matrix material during the thermoforming of the matrix material. The endothermic gasification is combined with a temperature reduction which can then be used for the rapid hardening of the thermoplastics. The advantage of an endothermic gas-creating substance lies in the controlled process of gasification and the shorter cycle periods.

In addition, physical gases consisting of easily evaporating hydrocarbons (pentene to heptane KP 30 to 100° C.) can be used for the procedure. Chemical exothermic Azo-combinations, N-nitroso-combinations and sulfonyl-hydracides can also be employed at kick-off temperatures from 90 to 275° C. Suitable chemical endothermic (temperature raising) agents are $NaHCO_3$ and Hydrocerol. The previously mentioned substances generally start decomposing as soon as they reach a certain kick-off temperature, which corresponds to the requirements for the matrix materials, thereby creating gas. The widely-used azo-dicarbonamid can be adjusted to starting temperatures of 155–200° C. by so-called kick-offs, for example Pb- and Sn stabilizers.

The blowing agent substances are produced as powders or granular materials. They will be added to the hopper of an injection molding machine as a granular material or, for epoxy components, as liquid additives (powder). During the extruding, injection molding, and pressing processes, the gasification process is laid off by the high injection pressure.

Moreover, gas-creating insertion elements can be inserted which consist of heat-resistant explosives that release the prescribed amount of gas through electric ignition. This method is presently used for airbags in the automobile industry. For the complete explosive transition, insensitive explosives (blasting agents) require effective ignition agents (celluloseulose nitrate, Hg-fulminate, plumbum acid, argentum acid, tetracene, nitrophenol (diaodine nitrophenol), plumbum nitroresorcinate) or boosters (e.g.: glycerine nitrate, glycol di-nitrate, ammonium nitrate).

For the usage the processes of GFK, CFK, RFC, wood pulp or celluloseulose as porous and viscose matrix material, the gasification can happen within film blisters or airbag/mattress-like welded double films optionally; thus, a lightweight compound with a waver structure or honeycomb structures or an egg-crate shaped inner layer can be created.

Figure 2A:
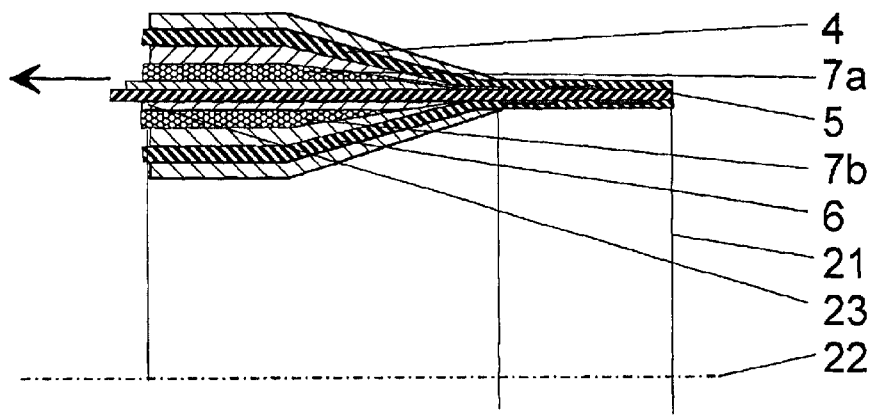
Figure 2B:
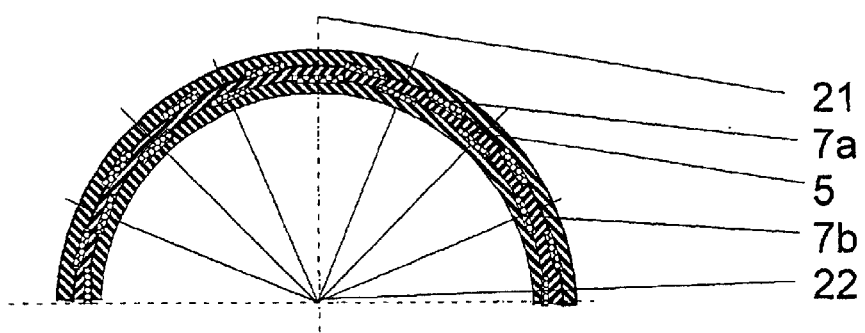
Figure 2C:
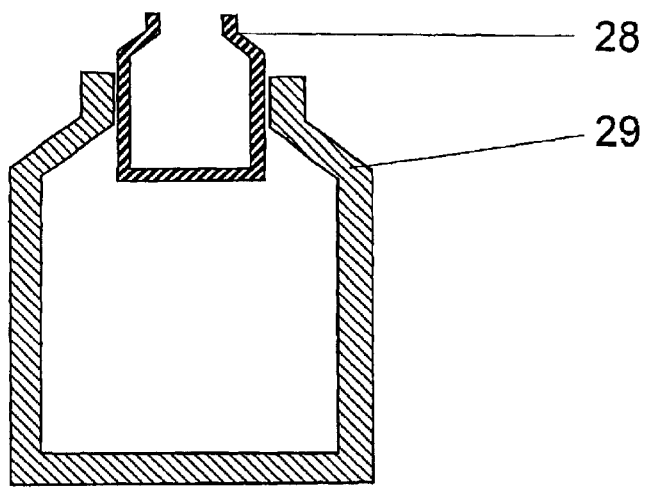
Figure 2D:
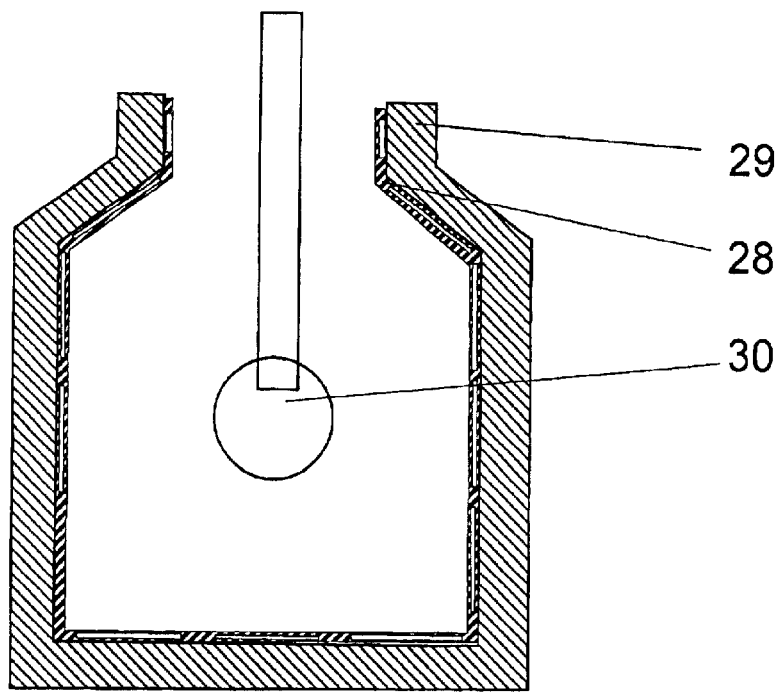
Figure 2E:
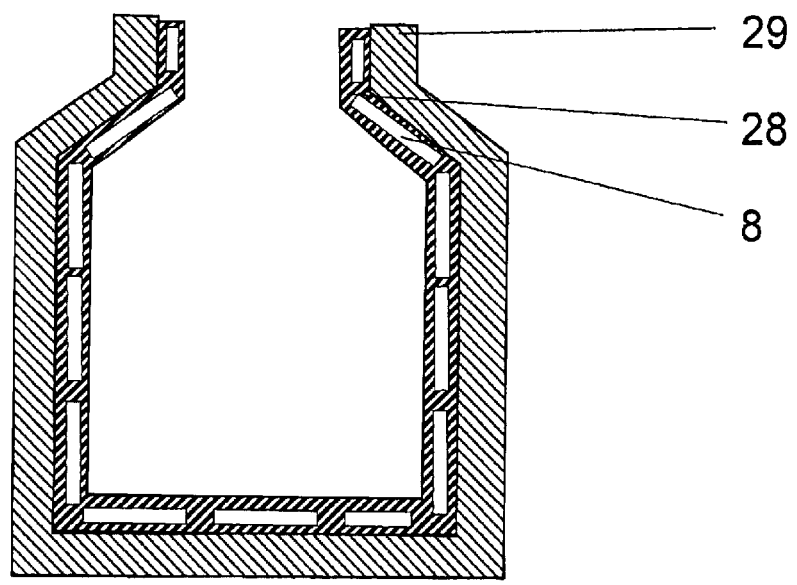
Figure 3A:
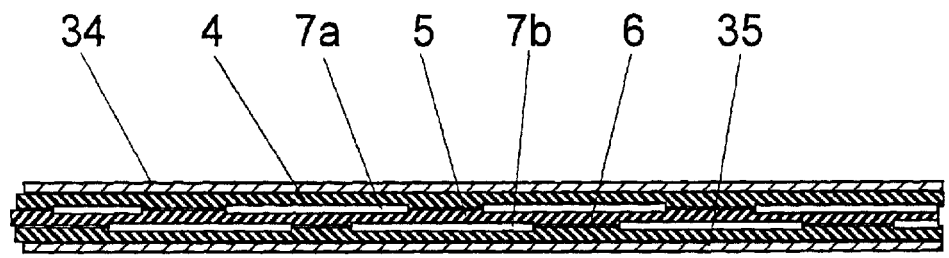
Figure 3B:
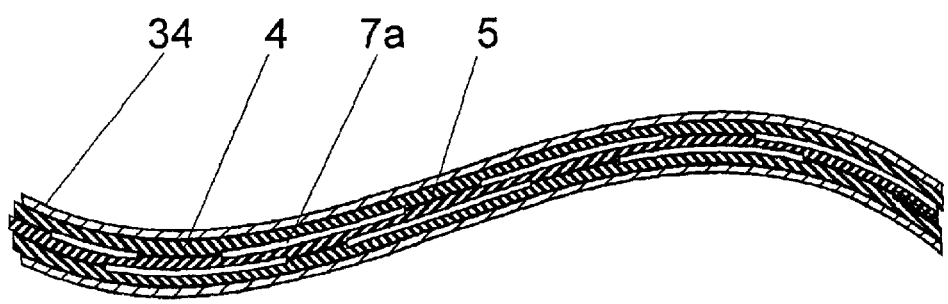
Figure 3C:
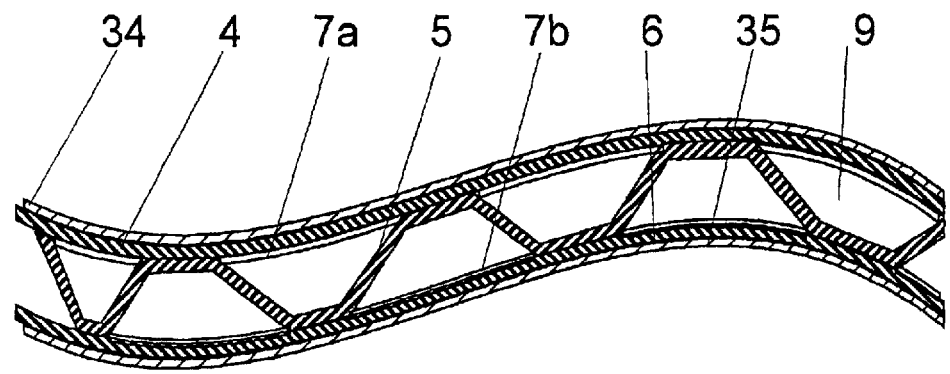
Figure 4A:
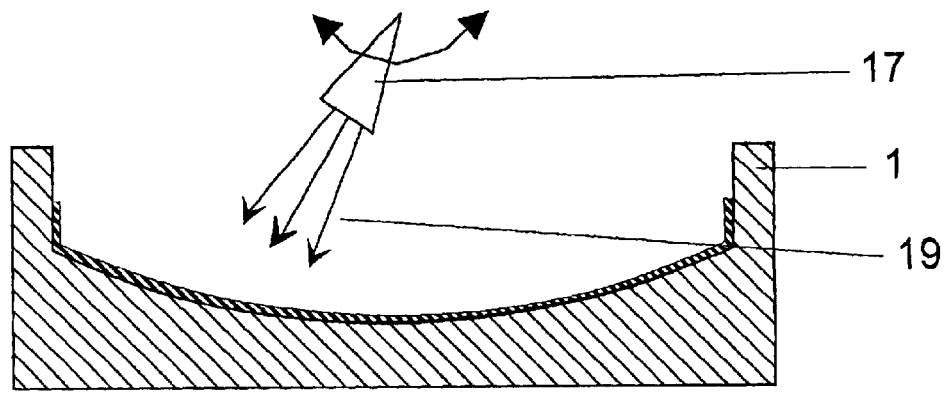
Figure 4B:
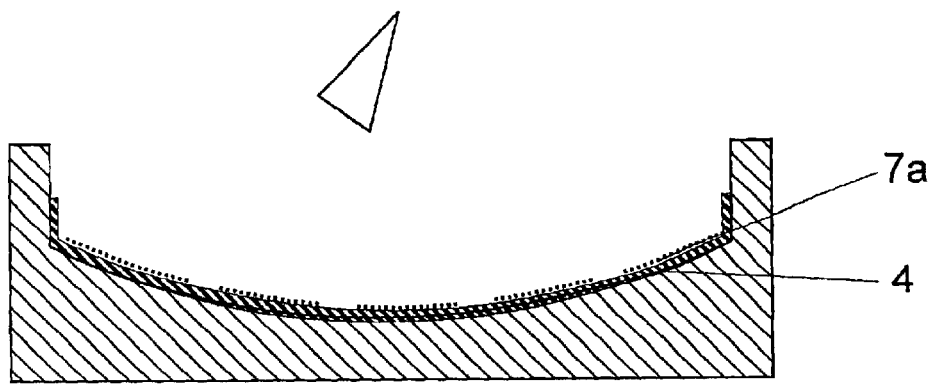
Figure 4C:
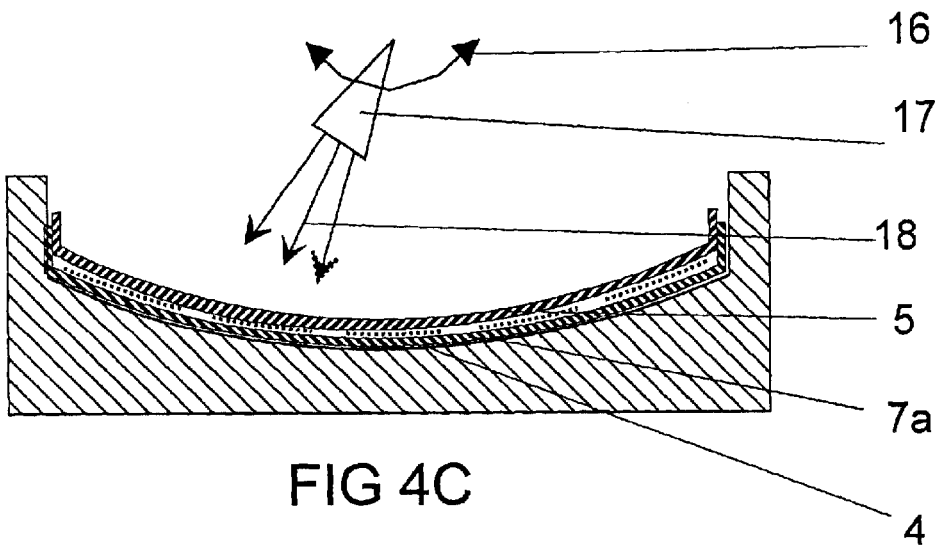
Figure 4D:
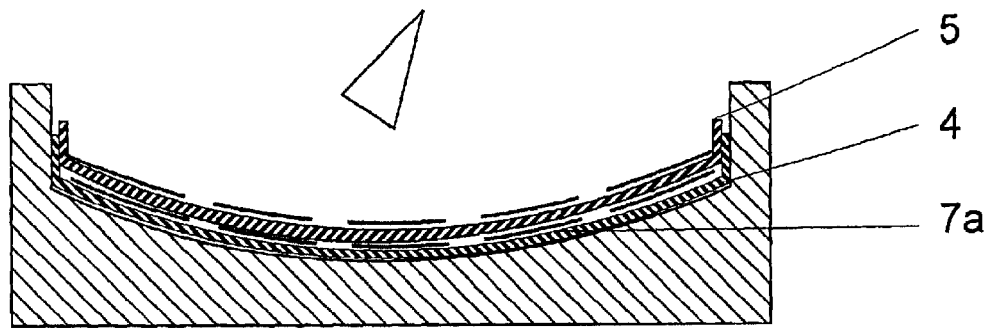
Figure 4E:
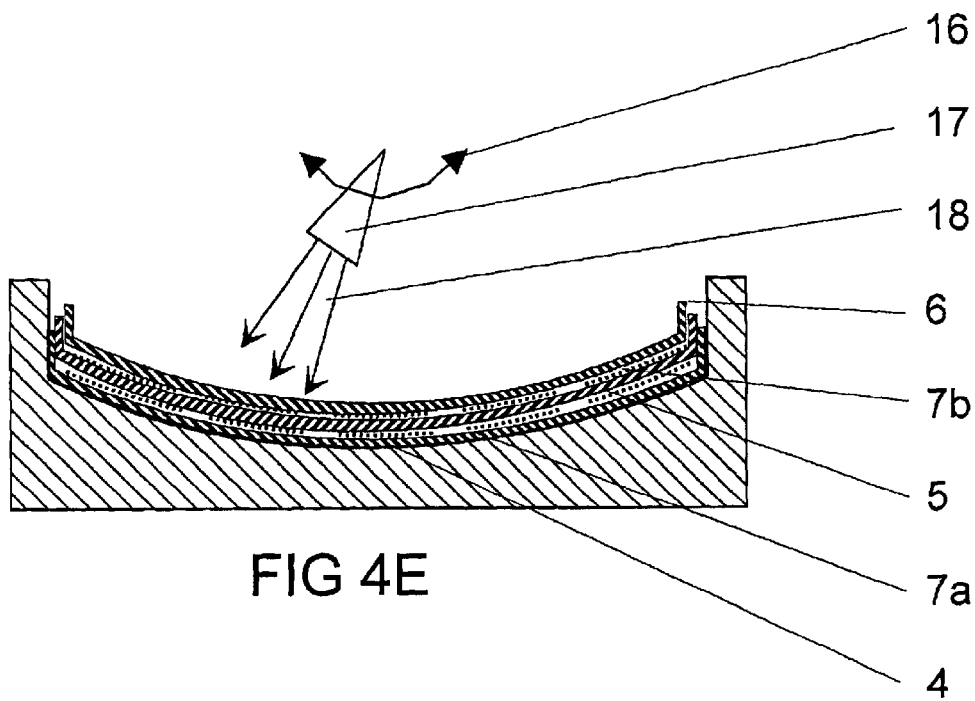
Figure 4F:
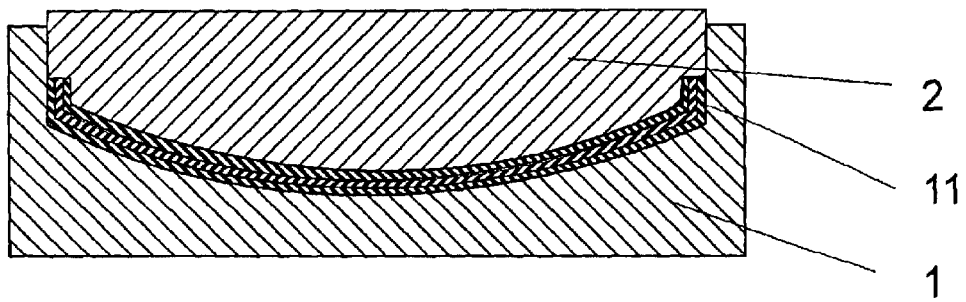
Figure 4G:
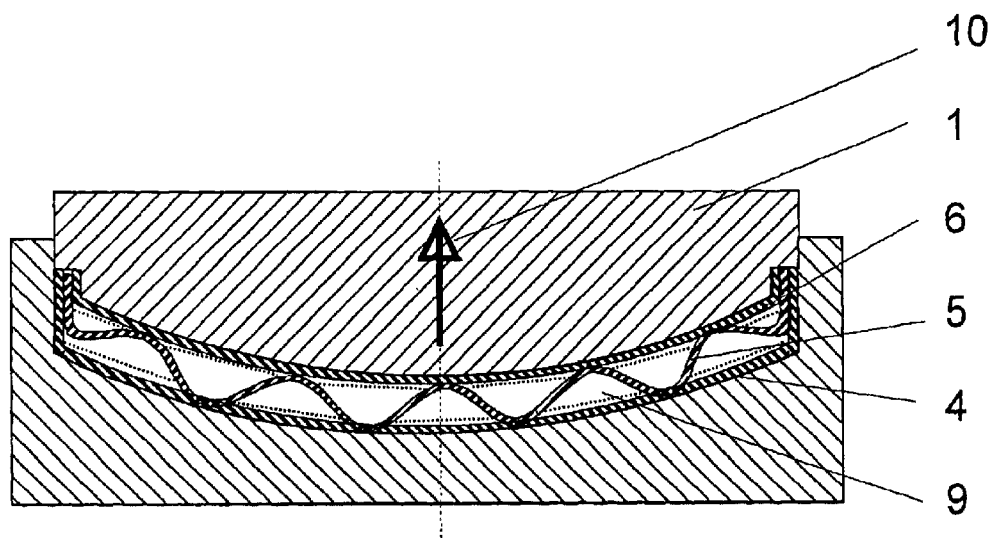
Figure 4H:
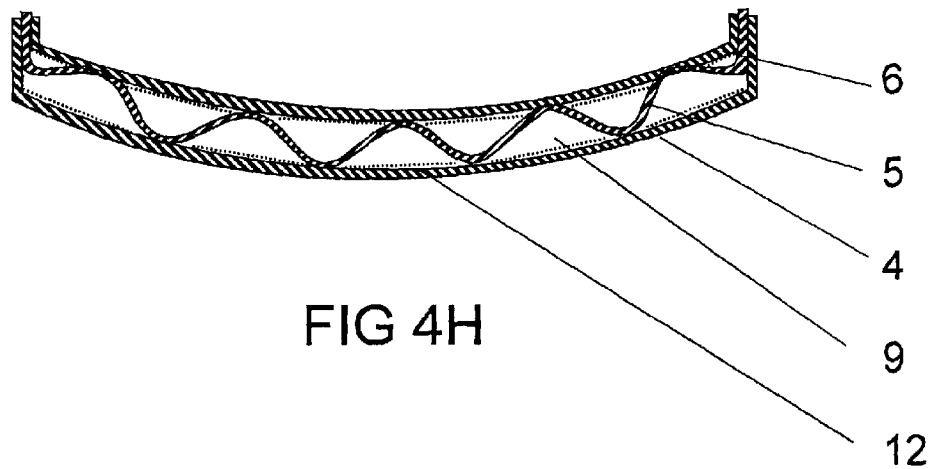
Figure 5A:
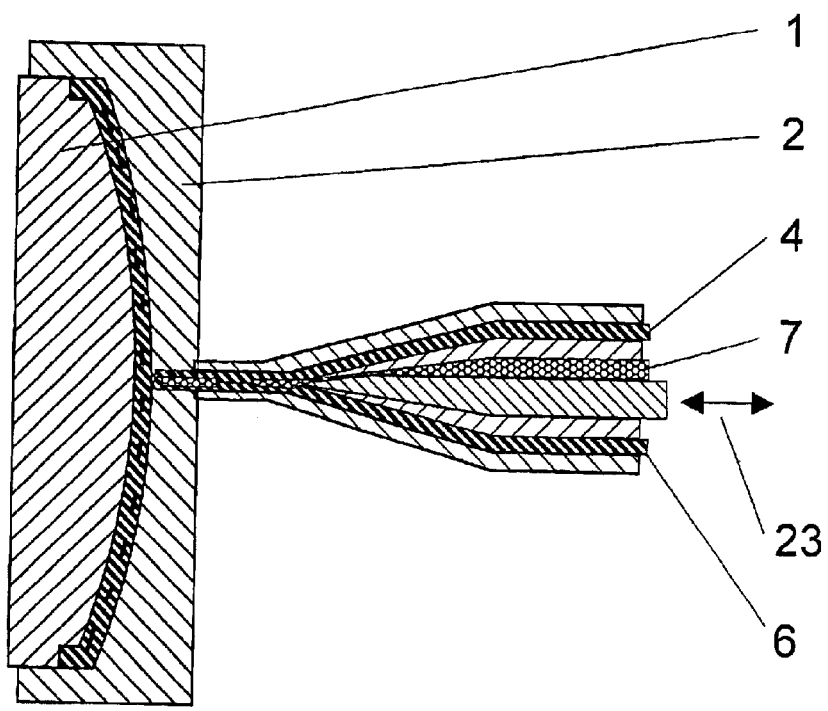
Figure 5B:
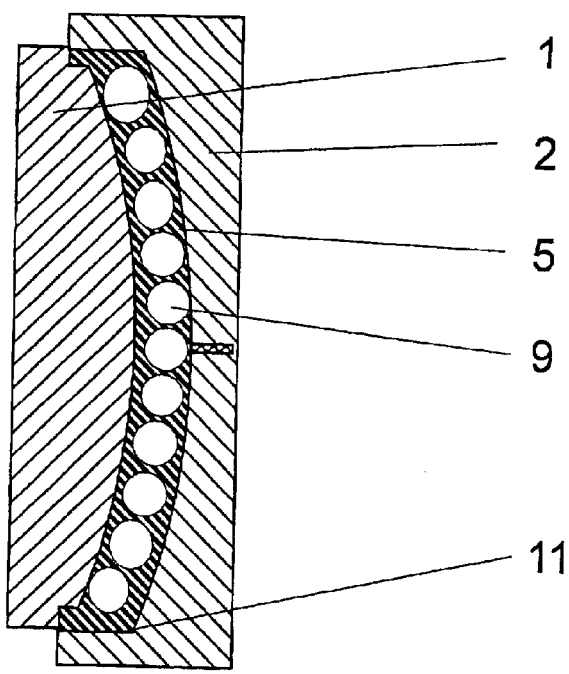
Figure 6A:
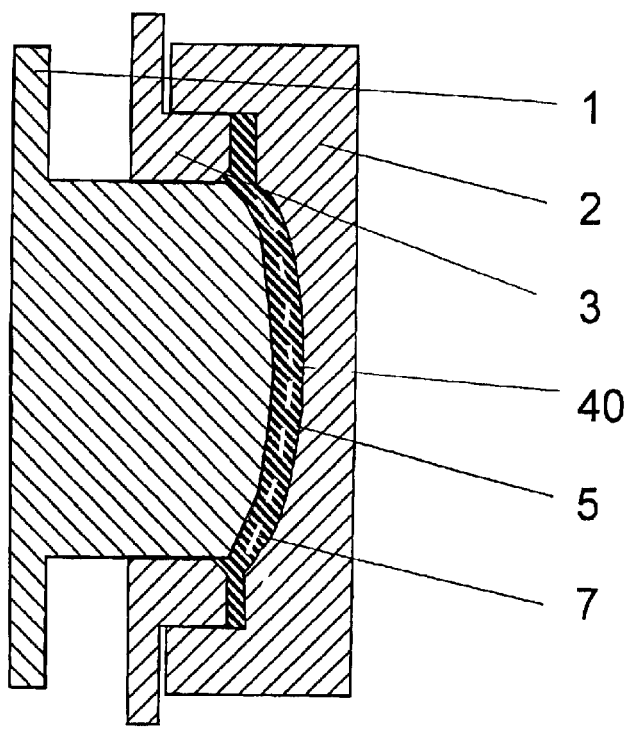
Figure 6B:
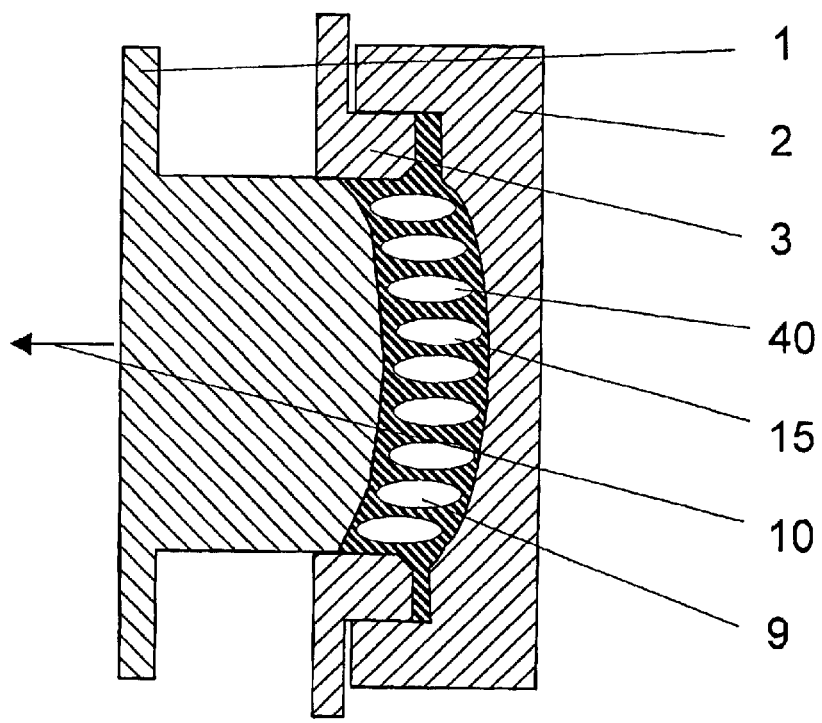
Figure 7A:
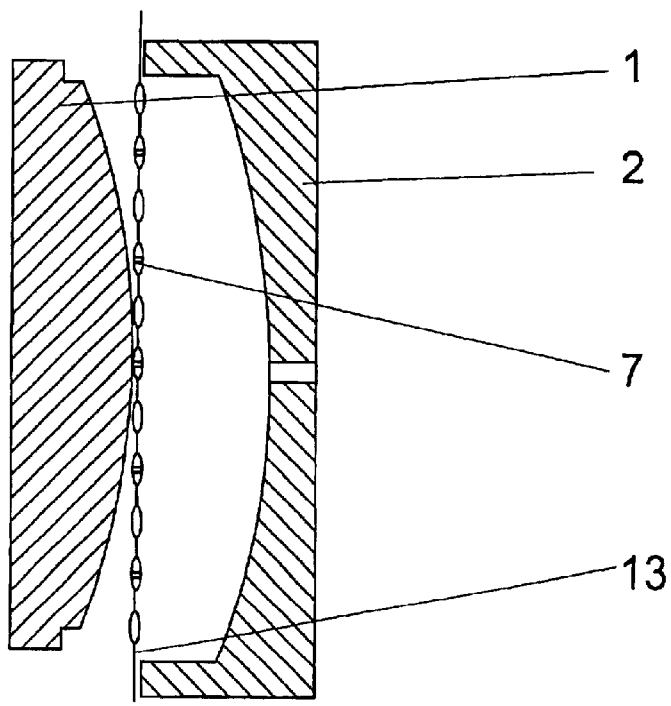
Figure 7B:
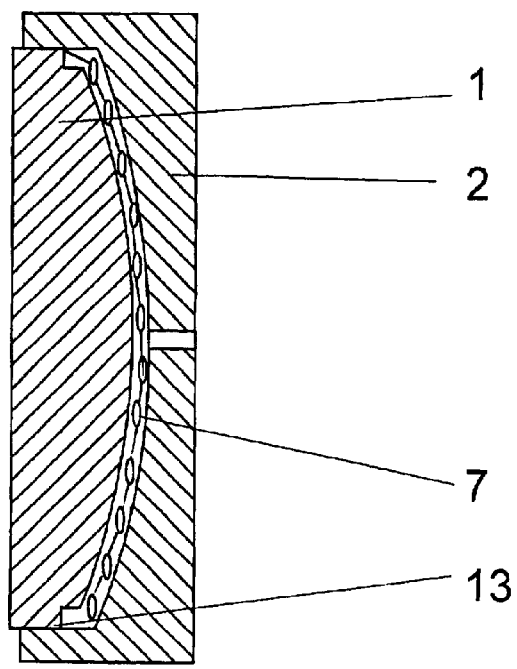
Figure 7D:
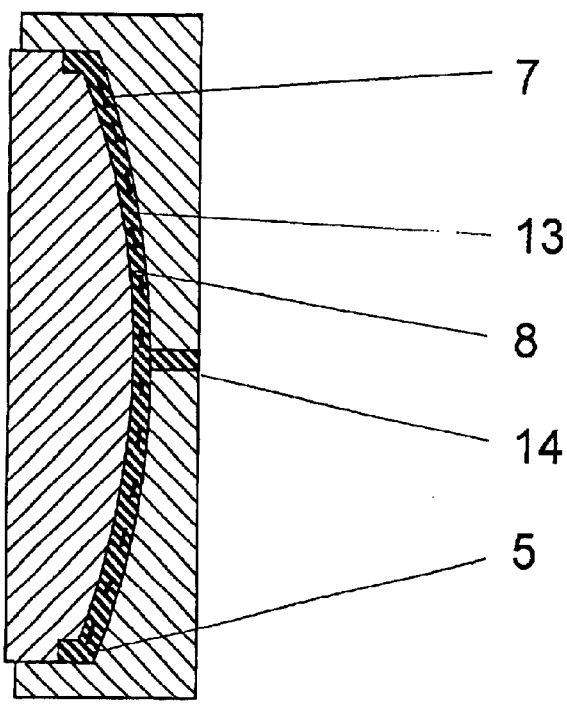
Figure 7C:
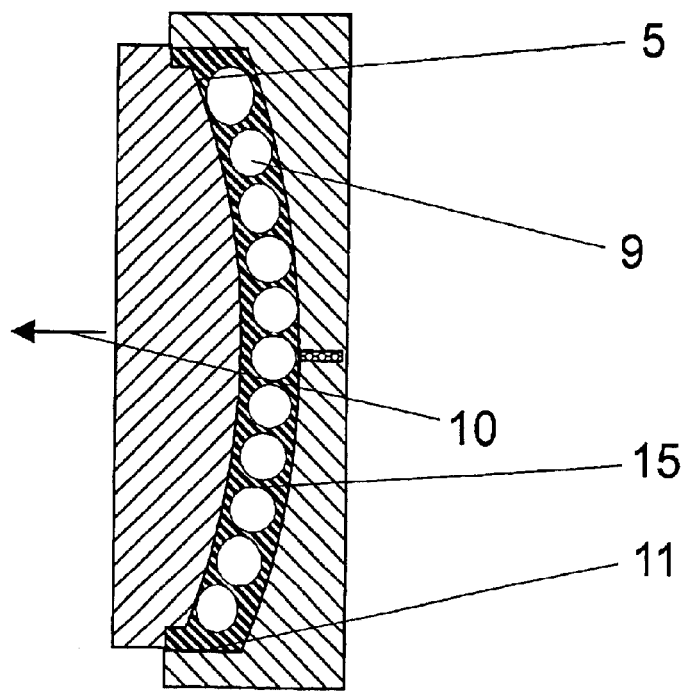
Figure 8A:
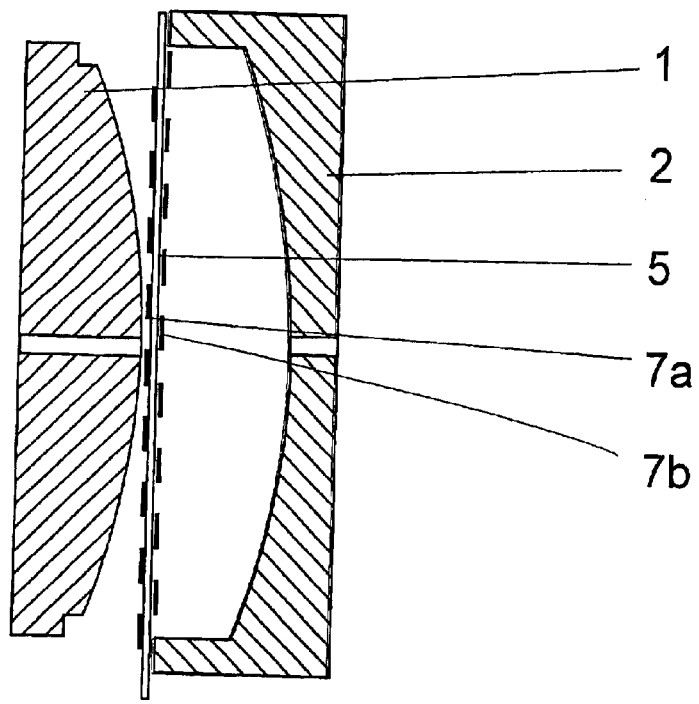
Figure 8B:
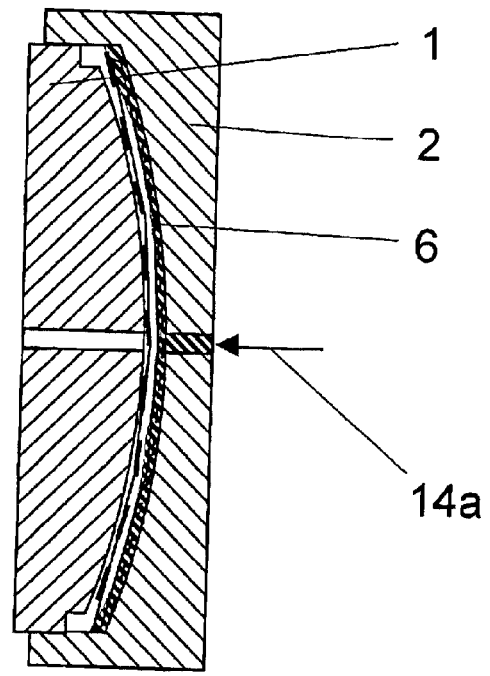
Figure 8C:
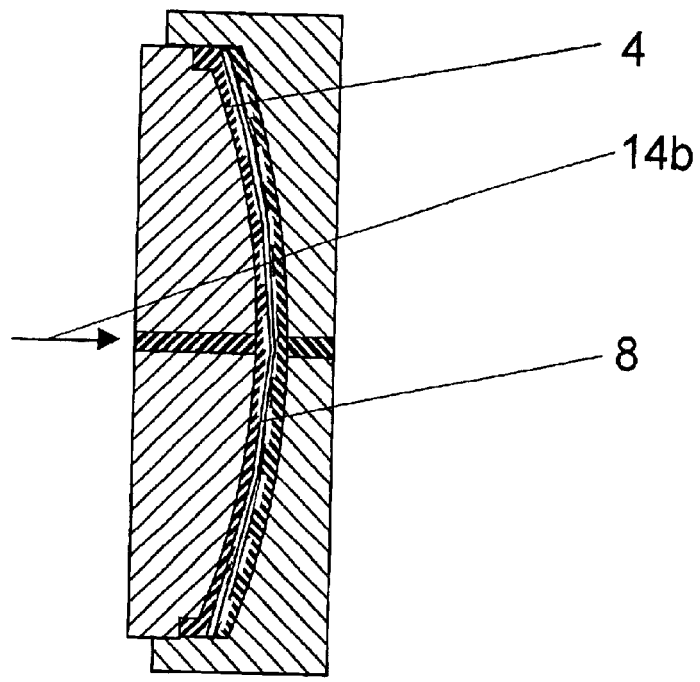
Figure 8D:
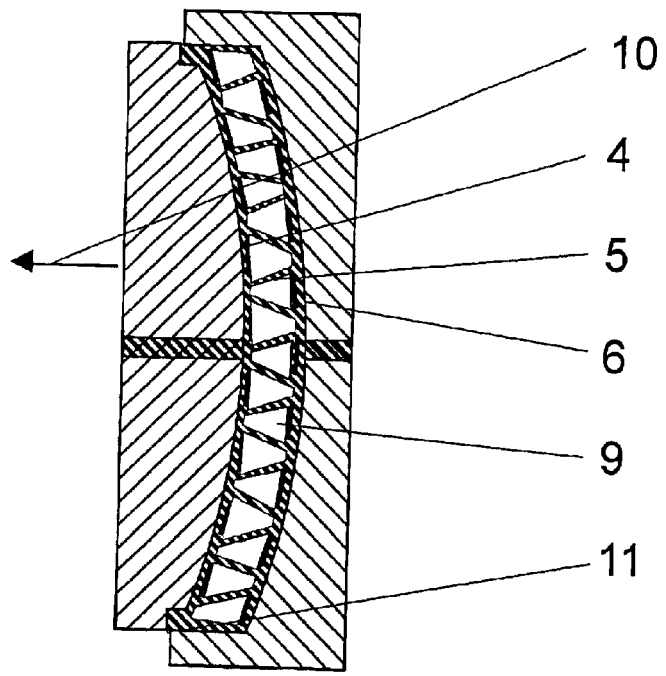
Figure 9A:
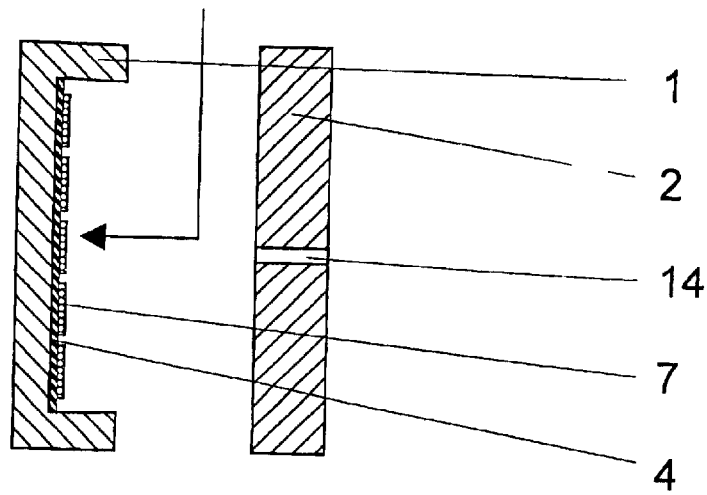
Figure 9B:
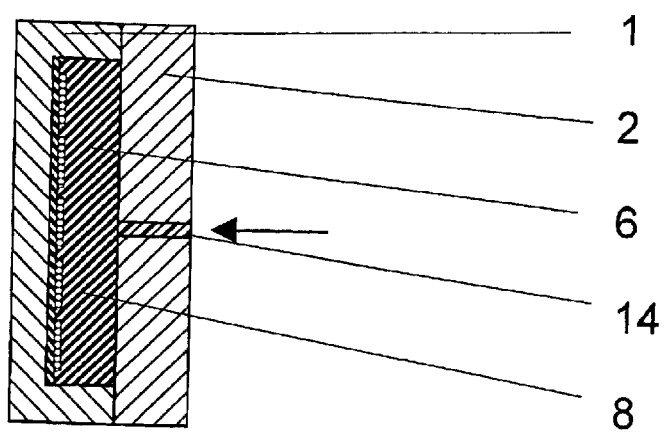
Figure 9C:
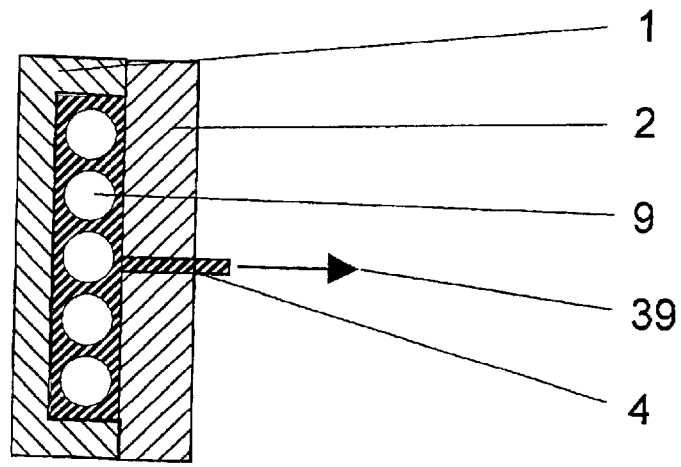
Figure 10:
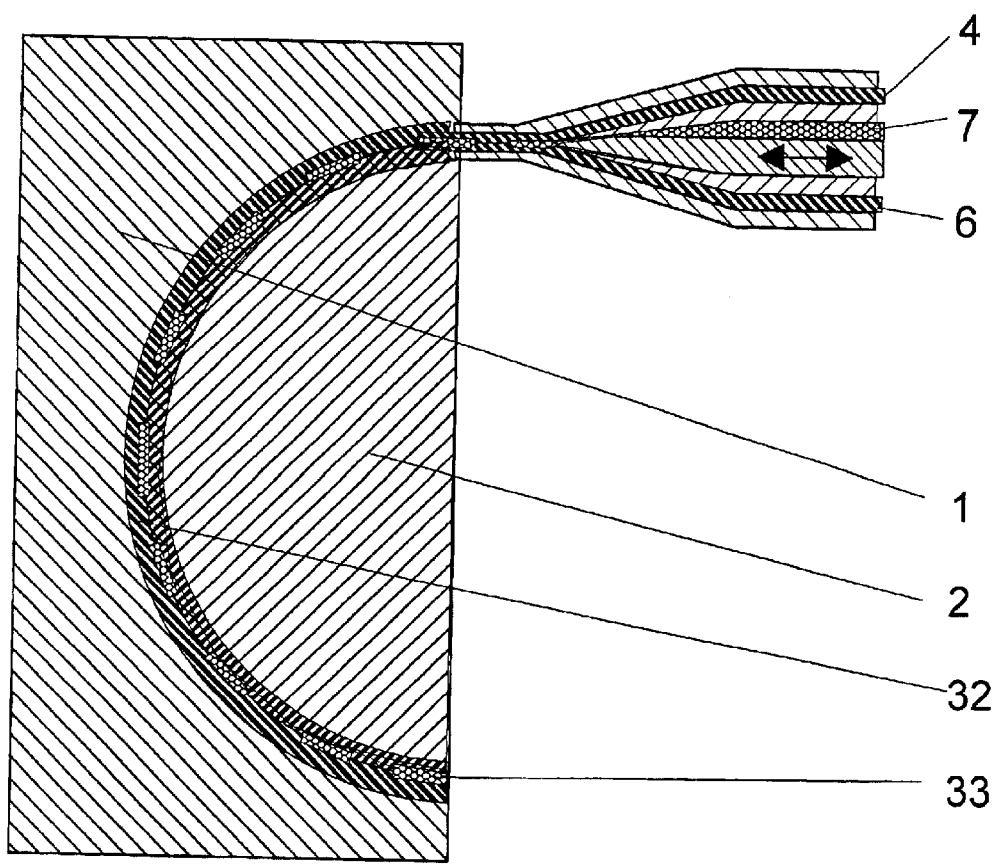
Figure 11A:
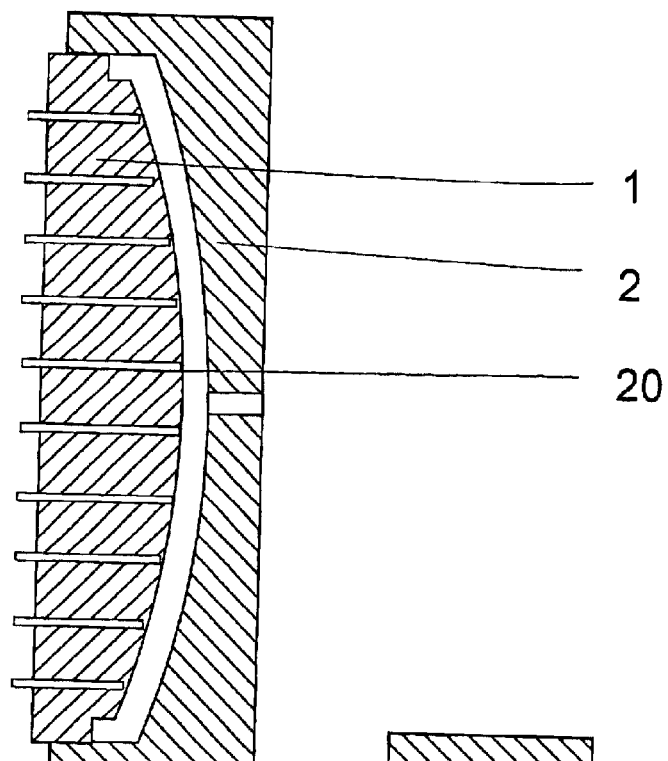
Figure 11B:
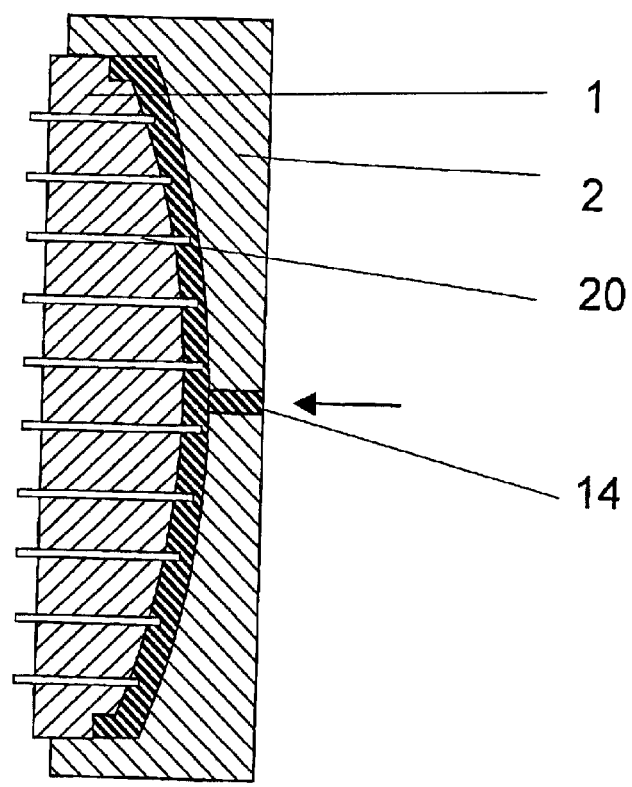
Figure 11C:
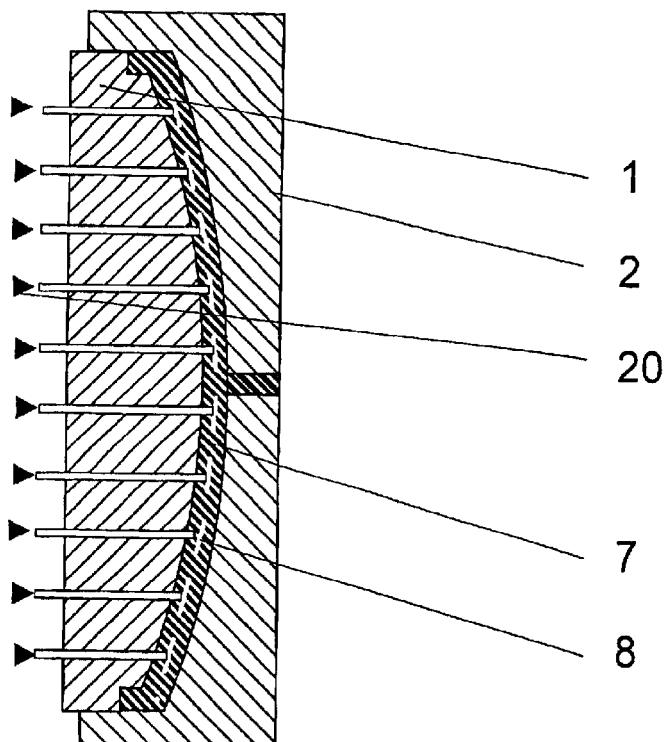
Figure 11D:
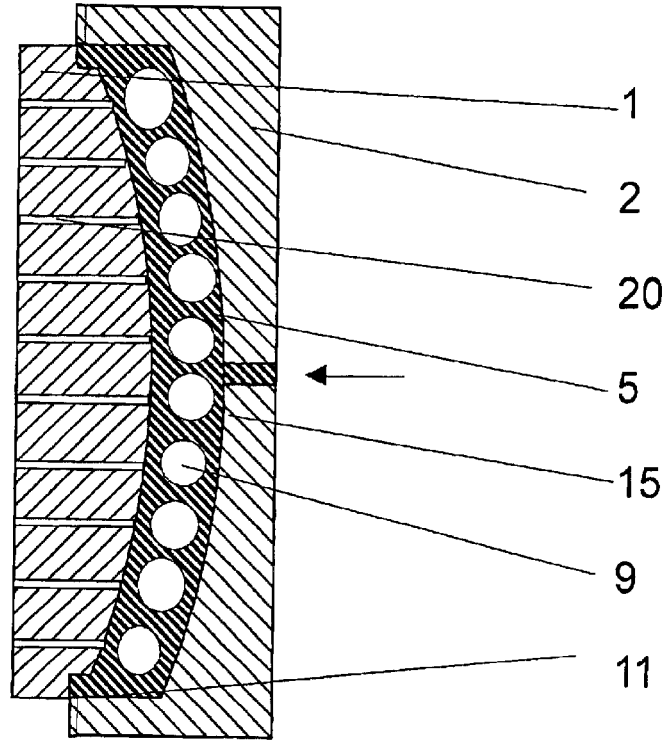
Figure 12:
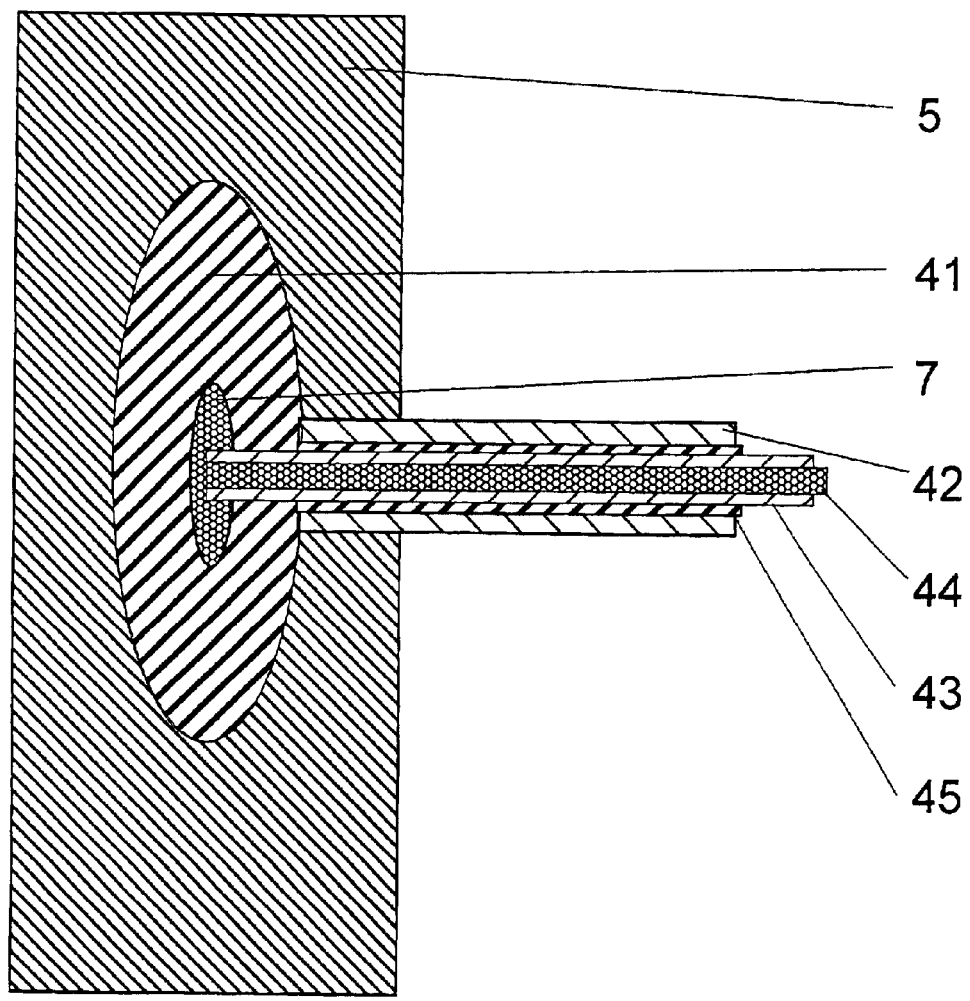
Figure 13A:
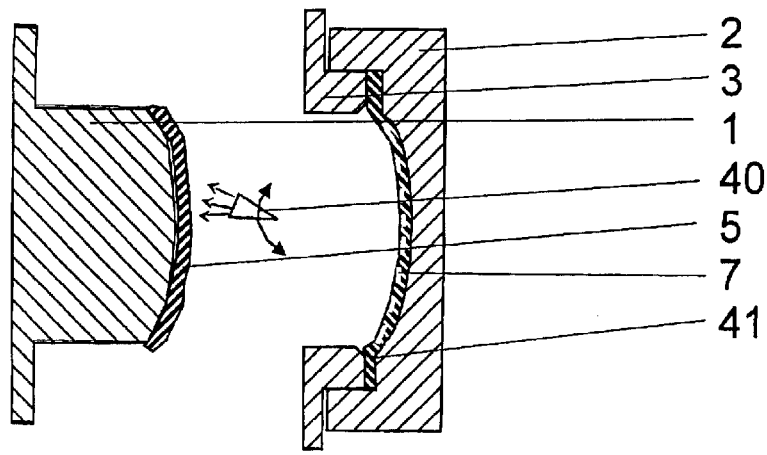
Figure 13B:
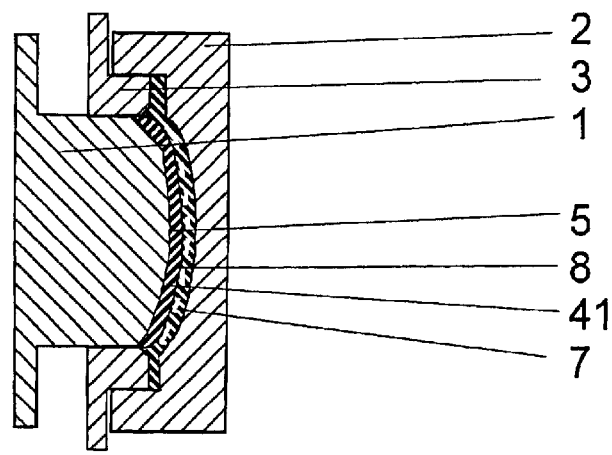
Figure 13C:
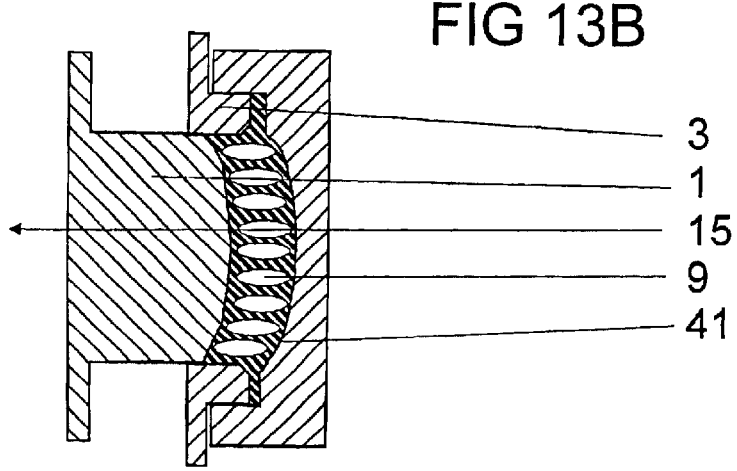
Figure 14A:
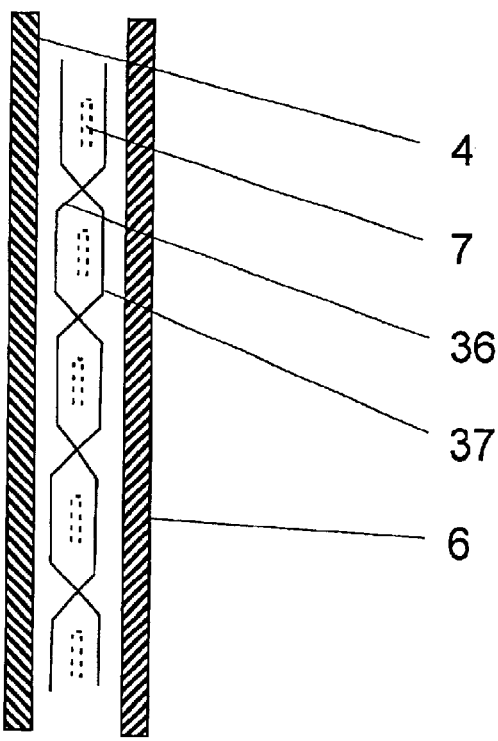
Figure 14B:
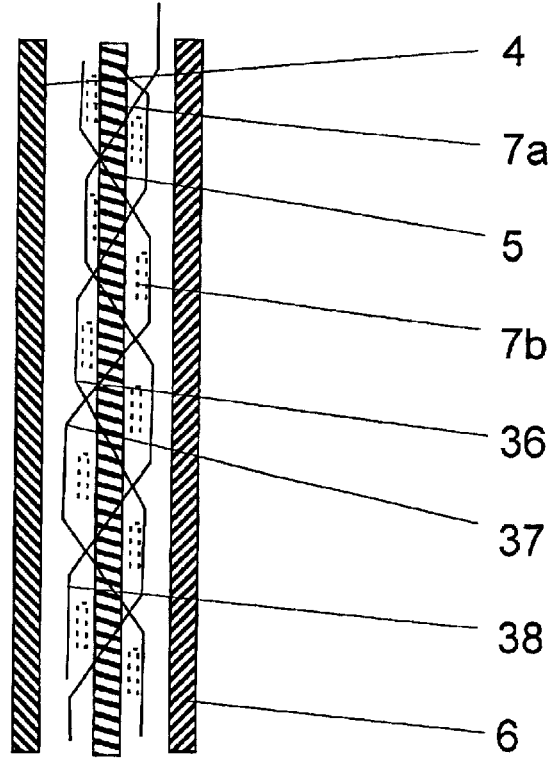
Figure 15A:
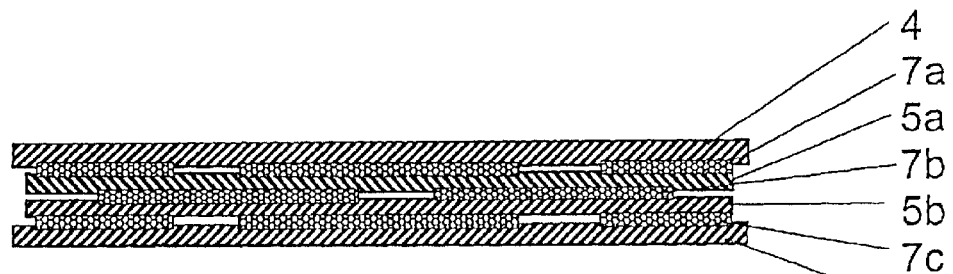
Figure 15B:
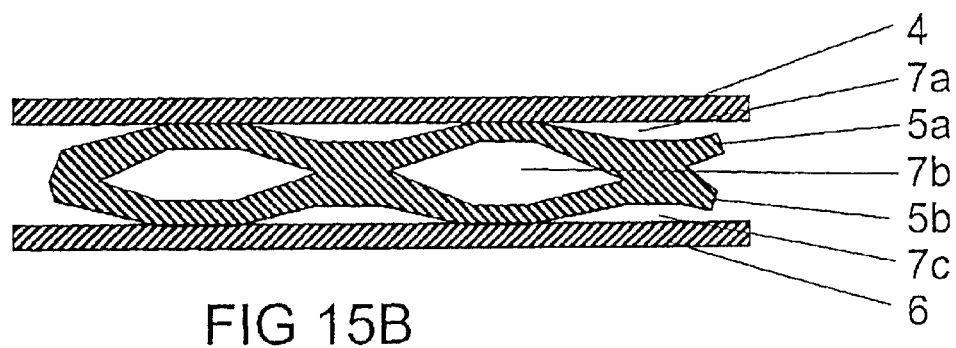
Figure 15C:
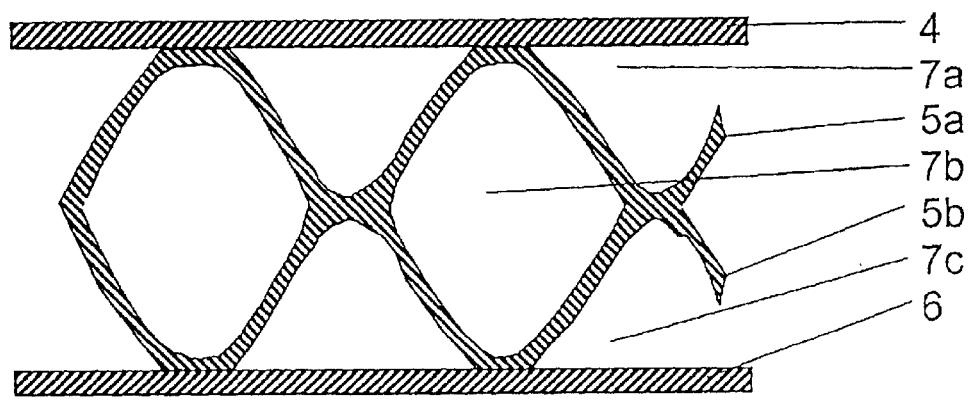

The following figures will describe the invention in more detail:

FIGS. 1A to 1D pressing
FIGS. 2A to 2E blow-molding
FIGS. 3A to 3C thermoplast metal sheet compound
FIGS. 4A to 4H reinforced fiber plastics vacuum forming or reaction processes and pressing
FIGS. 5A to 5B injection molding with co-injection
FIGS. 6A to 6B In-mold coating injection molding
FIGS. 7A to 7D Injection molding with pre-forms and net insertion
FIGS. 8A to 8D Injection molding with pre-forms insertion
FIGS. 9A to 9C Injection molding with reflux melt and pre-form insertion
FIG. 10 Two-component injection
FIGS. 11A to 11D Insertion of gas-creating substances
FIG. 12 Coated insertion of gas-creating substances
FIGS. 13A to 13C Textile rear injection molding
FIGS. 14A to 14B Reinforced pre-formed inserts
FIGS. 15A to 15C Thermoforming FIGS. 1A to 1D show the procedure scheme of the process of pressing. Between mold parts (1) and (2) (see FIG. 1A) of a press (which is not shown), a pre-formed insert is placed which consists of a upper left surface layer (4), a matrix layer (5) and a lower right surface layer (6). To the left of the matrix material (5), gas-creating insertion elements (7a) are arranged in a pattern. Further gas-creating insertion elements (7b) are arranged to the right of the matrix material (5) in an offset pattern. These layers of matrix material (5) and insertion elements (7a), (7b) can optionally be arranged multi-layered. By closing the press (see FIG. 1B) the compound part is grouted and the gasification of insertion elements (7) will be caused by pressure and/or temperature. After complete gasification the mold parts (1) and (2) are drawn apart, whereas the mold parts (1) and (2) are sealed against each other by means of a dipping rim (11), in order to maintain the gas pressure to lift off the matrix material (5). The part detached from the mold parts (1) and (2) (see FIG. 1D) now consists of the left surface layer (4), the matrix material (5) which is now spherically thermoformed through the gas pressure, and the right surface layer (6). The residues (12) of the gas-creating element (7) remain in the cavities (9). By arranging the insertion elements (7) in rings, hexagons or octagons and correspondingly displacing the insertion elements (7) on the two sides of the matrix material (5), honeycomb-shaped intermediary layers can be created, which have separate macro-cavities (9) and are homogeneously bound to the surface layers (4) and (6). The essential economical advantage lies in the fact that this compound part is produced in one working cycle without the otherwise additionally necessary steps of binding the surface layers with the honeycomb matrix material.

FIGS. 2A to 2E show the scheme of the blow molding process. Such a process would be an essential application for the plastically inserted gas-creating elements (7). The pre-forms to the blow molds are either produced by injection molding (see FIG. 7 or 8) or they are extruded—as shown here in FIGS. 2A and 2B. The actual blowing process is independent from the production of the pre-forms and is shown in FIGS. 2C to 2E FIG. 2A shows a part of a sectional view of a five-layered co-extrusion injection nozzle, that forms a rotation cylinder around an axis (22). The five processed materials consist of the upper surface layer (4), the upper gas-creating insertion elements (7a), the matrix material (5), the lower insertion elements (7b) and the lower surface layer (6). In the extrusion process, the upper (7a) and the lower (7b) gas-creating insertion elements are inserted in a pattern between the layers (4) and (6) and the matrix material (5). This is controlled by segmented subdivided slides (23) which are moving back and forth. Consequently, a tubular, continuously extruded hose (21) will be formed. In FIG. 2B the extruded hose (21) is shown as a sectional view. The gas-creating insertion elements (7a) are arranged in an offset pattern to the gas-creating insertion elements (7b). In the known production method for pre-forms, a part of the hose will be cut off and pressed. The pre-form (28) is inserted into the mold (29), as shown in FIG. 2C, and is blown to fit to the outer conture. FIG. 2D shows how an initiator (30) is inserted for the stimulation of the gasification of the insertion elements (7). The gasification can be activated by means of ultraviolet light. While the materials (4), (5) and (6) are still in the thermoforming condition, the gas-creating insertion elements (7) will cause the cavities (9) and will form a multi-layer part. The multi-layer part now has a doubly corrugated (like an egg crate) inside compound with a smooth external wall. The double layer protects from leakage and increases the thermal insulation and the stability of the container.

FIGS. 3A to 3C illustrate the procedure for the production of thermoplast metal sheet compounds. A thermoplastic pre-form is inserted between an upper metal sheet (34) and a lower metal sheet (35) (see FIG. 3A). This pre-form consists of an upper surface layer (4), the upper gas-creating insertion elements (7a), the matrix material (5), the lower gas-creating insertion elements (7b) and the lower surface layer (6). FIG. 3B shows the thermoplastic metal sheet compound which is deformed in a die press brake (not shown); this metal sheet compound then thermoplastically deforms the matrix material (5) in FIG. 3C after the initiation of gasification and optional endothermic heat formation through the gas pressure, thus drawing apart the mold parts (1) and (2).

FIGS. 4A to 4F show the schematic procedure for the RFC vacuum shaping or the fiber spraying and pressing. In the mold part (1), a lower surface layer made of fibers soaked with resin (4) is applied as a fiber reinforced plastic layer (19) by means of an extrusion head (17) that is swung (see FIG. 4A). Afterwards, the gas-creating insertion elements (7a) will be arranged (see FIG. 4B). The matrix material (5) is also inserted as a fiber reinforced plastic spraying (18) (see FIG. 4 C). Then the upper gas-creating insertion elements (7b) (see FIG. 4D) will be arranged on top.

Finally, the upper surface layer (6) is sprayed to the matrix (5) (see FIG. 4E). Mold part (1) is now shut and pressed to mold part (2). If desired, the gas that is left in between the layers can be sucked off by vacuum. The dipping rim (11) of the mold parts (1) and (2) serves as a seal. The fiber layers are grouted to inter-link the contacting areas of the layers. Gasification will be initiated by means of pressing, temperature or, for example, ultraviolet light (see FIG. 4F). In FIG. 4G, mold part (2) will be lifted by controlled motion after homogenous gasification, and the matrix material (5) which has not yet hardened is spherically deformed by gas pressure. FIG. 4H shows the compound after curing the epoxy part with upper surface layer (6), matrix material (5) and the lower surface layer (4). In the cavities (9), the residue (12) of the gas-creating substances (7) remain. Consequently, a light-weight construction part with cavities can easily be produced.

FIGS. 5A and 5B show the procedure for injection molding in the co-injection process. The co-injection nozzle in FIG. 5A is schematized as a 3-layered version. (4) designates the upper surface layer, (6) is the lower surface layer. The middle nozzle injects gas-creating elements (7) as an extruded component. By means of the slide (23), the interlayer is alternately pressed between surface layers (4) and (6). In accordance with the viscosity of layers (4), (6) and (7), a regular flow from surface layers and insertion elements (7) pours between mold part (1) and (2). Mold parts (1) and (2) are moved apart as shown in FIG. 5B after the initiation of the gasification process whereas the mold parts remain gas-proof due to a dipping rim (11) in between them, so that the cavities (9) are spatially thermoforming the matrix material (5) by the internal gas pressure. In this procedure, recycling material can be used. By the use of plastic gas-creating agents below the reaction temperature and the (exact) co-injection, optionally with an interruption cycle in the extrusion, as well as the subsequent ignition of the gas-creating process and the subsequent expanding motion of mold parts (1) and (2) when cooling down, a molded piece will be created with a double layered film and optionally with webs in between.

The FIGS. 6A and 6B schematize the process for injection molding used in the "in mold coating" method. A material compound consisting of a film coating (46) and gas-creating insertion elements (7), that is preheated below the reaction temperature of the ignition agent, are inserted into a mold part (2) and pressed into mold part (1) while the core pull (3) is closed. Subsequently, the matrix material (5) will be sprayed from the rear of the part to the film coating (46) with gas-creating insertion elements. The ignition agent of the gas-creating substances is now heated above ignition temperature by the injected thermoplastics; thus allowing to move mold part (1) corresponding to the desired thickness of the compound during the lift-off of the matrix material (5).

The FIGS. 7A and 7D show the injection molding by means of a pre-form inserting procedure using a net. The insertion elements (7) of gas-creating substances are arranged in a pattern and fixed to a net (13) (see FIG. 7a). The net (13) and the elements (7) are placed between the mold parts (1) and (2) whereas a special device will preferably ensure a regular distance between the inner surface of mold parts (1) and (2) and the net (13). FIG. 7C shows the melt injection. An injection nozzle (14) pours the thermoplastic into the form and, serving as matrix material (5), rinses around the gas-creating insertion parts (7) which are held at the planned distances by the net (13). Gasification (8) is activated by pressure and/or temperature (see FIG. 7D). After the homogenous gas creation, mold parts (1) and (2) are removed and the joints remain gas-proof by means of the dipping rim (11). Cavities (9) are created by the widening of the matrix material (5) which are surrounded by plastically deformed epoxy (15). The gas-creating insertion elements (7) can optionally be placed in several layers with distances in between in an offset pattern, in order to create matrix materials (5) in honeycomb/egg crate shape.

FIGS. 8A and 8D schematize an injection molding process following the pre-form inserting procedure "pre-formed layer". An optionally preheated prefabricated pre-form consisting of a matrix material (5) is inserted between the mold parts (1) and (2). To the left and to the right of the matrix material (5), gas-creating insertion elements (7a) and (7b) are arranged in an offset pattern (see FIG. 8A). Optionally, these layers can be carried out repeatedly. After closing mold parts (1) and (2) (see FIG. 8B), the pre-form is thermoformed adapting to the mold shape. The mold parts (1) and (2) are opened to create a cavity for the right surface layer (6). The remaining cavity is injected with melt to have the right surface layer (6) poured into the form. The mold parts (1) and (2) are opened to create a cavity for the left surface layer (4). The injection of the left surface layer (4) is represented in FIG. 8C. By means of the second injection nozzle (14b), a hot melting epoxy is injected, which will activate gasification e.g. through pressure and/or temperature (see FIG. 8D). After the gasification has been completed, the mold parts (1) and (2) will be moved apart, whereas the parts remain gas-proof due to dipping rim (11). The part now consists of a left surface layer (4), a matrix material (5) which is now deformed spatially by gas pressure, and a right surface layer (6).

FIGS. 9A and 9C show the procedure for gas melt injection molding processes. After the insertion of the left surface layer (4) and of gas-creating insertion elements (7), the mold parts (1) and (2) are closed (see FIG. 9A). FIG. 9B shows the injection molding process, where the right surface layer (6) is injected above the injector nozzle (14). Gasification is initiated by the increase of temperature and/or pressurizing. FIG. 9C displays the reflux of the plastic melt (39) processes through the injection nozzle (14), with cavities (9) resulting from the created gas pressure.

FIG. 10 exhibit the schematic process of a two component plastics injection. The plastic insertion of the gas-creating substances can be achieved with a two component plastics machinery by means of injection of two epoxy surface layers (4) and (6), thus creating a two-layered material flow. In accordance with the hydraulic flow principles, the formed layers (32) are injected to the cavities between the mold parts (1) and (2) and then distributed and will then form areas with gas-creating characteristics (33). The plastic material of the gas-creating insertion elements (7) is injected as one part of the two components. Both volume and distance of the insertion elements are controlled via the second component and/or distributed by the injection nozzle according to speed and volume. The mold parts (1) and (2) will be kept under pressure until all gas-creating insertion elements (7) have been activated in order to enable the subsequent creation of cavities after moving apart mold parts (1) and (2).

FIGS. 11A to 11D display a process to add gas-creating insertion elements (7) to the matrix by blister injection. Mold part (1) contains several injection needles (20) which are arranged in a sliding axial position (see FIG. 11A). Matrix material (5) is injected through an injection nozzle (14) (see FIG. 11B) in between the mold parts (1) and (2). The injection needles (20) which are placed in mold part (1) are pushed forward to the matrix material (5) (see FIG. 11C). The gas-creating substances (7) are injected through these needles on to the matrix material (5) while additional volume is added to the mold by moving apart the mold parts (1) and (2) and will activate gasification by pressurizing and/or temperature (see FIG. 11D). The injection needles (20) are subsequently pulled back. After the gasification is completed, the mold parts are moved apart according to the designed thickness of the structure, whereas the form remains gas-proof due to the dipping rim (11). Cavities (9)

are created which are surrounded by plastically deformed epoxy (15) created by the matrix material (5). To create multiple-layered cavities, the injection needles (20) can be positioned in different axial positions.

FIG. 12 schematizes the procedure for a coated blister injection with gas-creating insertion elements. Here, the injection needle consists of two concentric tubes. Inner tube (45) and external tube (42) are moved into the matrix material (5). In the first step, a ductile thermoplastic material (41) is injected into the matrix material (5) through the space (43) between external and inner tube. The gas-creating insertion element is injected into the ductile thermoplastic material (41) by the inner tube (44). The tubes (45) and (41) are then withdrawn to form a blister covered with ductile epoxy containing gas-creating substances.

FIGS. 13A and 13C show a textile rear injection molding procedure. Into the mold part (1), a textile (41) is inserted. By means of a spraying nozzle (40), the melt is put on as matrix material (5). On top of this melt, gas-creating insertion elements are injected and then covered with the matrix material (5) (see FIG. 13A). The mold parts (1) and (2) are closed while the core pull (40) is shut (FIG. 13B). After the pressing of the matrix material (5) with the textile (41) and the gas-creating insertion elements (7), gasification (8) takes place. FIG. 13C displays the procedure where core pull (40) is moved apart from mold part (1) and textile (41). Cavities (9) are generated in between mold part (1) and the core pull (40).

FIGS. 14A and 14B illustrate the procedure employing a reinforcement layer surrounding the gas-creating insertion elements (7). FIG. 14A depicts a gas-creating insertion element (7), which is reinforced by tissue threads. The first layer of reinforced fibers (36) alternately winds around insertion elements (7), placing the second layer of reinforced fibers on the other side of the insertion elements (7). Surface layers (4) and (6) can then be applied on top optionally. A two-layered gas-creating insertion layer (7a) and (7b) is represented in FIG. 14B. Both layers surround the matrix material (5). The first layer of reinforced fibers (36) alternately winds around the second layer of reinforced fibers (37) and the third layer of reinforced fibers (38). Surface layers (4) and (6) are applied on top optionally.

The FIGS. 15A to 15C show the procedure for the "thermoplastic thermoforming" process by means of a 4-layered part with 3 layers of gas-creating insertions (7a) to (7c). Upper surface layer (4) and the upper matrix material (5a) surround the gas-creating upper insertion elements (7a). Between the matrix materials (5a) and (5b), the middle gas creating insertion elements (7b) are positioned. The gas-creating insertion elements (7c) are placed between matrix material (5b) and the lower surface layer (6). Through the internal gas pressure initiated by pressure or temperature and the moving apart of surface layers (4) and (6), the thermoplastic deformation of the matrix materials 5a and 5b will be initiated; as a consequence, the part shown in FIG. 15C will be created which shows a (highly solid) web structure of high firmness after cooling.

Item List 1 primary mold part
2 second mold part
3 core pull
4 surface layer
5 matrix material
6 second surface layer
7 insertion elements
9 cavity
11 dipping rim
12 residue of blowing agent fibers
13 net
14 injection nozzle, spraying unit
15 matrix material spherically deformed
17 injection unit/device
19 fiber reinforced plastic layer
20 injection needle
21 extruded multi-layer hose
22 axis of the nozzle
23 slide
28 pre-form for blow-molding
29 blow mold
30 ignition agent
32 layer of blowing agent
33 gas-creating layer
34 upper metal sheet
35 lower metal sheet
36 first layer of reinforced fibers
37 second layer of reinforced fibers
38 third layer of reinforced fibers
39 reflux of plastics melting
40 textile rear injection molding
41 surrounding plastics blisters
42 external injection needle
43 inner injection needle
44 gas-creating substance
45 low-melting epoxy
46 film coating

What is claimed is:

1. A process for producing light weight plastic molded articles comprising the steps of:
    a) providing a mold having a movable mold half and a stationary mold half forming a mold cavity between said mold halves when said mold halves are brought together into a molding relationship;
    b) providing a nozzle having a tip with a tip passage in fluid communication with said mold cavity during filling of said mold cavity, said nozzle having a body with outer passages and an inner passage in fluid communication with said tip passage and a slide movable into said inner passage to provide fluid communication of said inner passage with said tip passage and out of said inner passage to provide fluid communication of said inner passage with said tip passage;
    c) providing under pressure i) plastic molding material to said outer passages and ii) a substance creating gas when activated to said inner passage;
    d) moving said slide into and out of said central passage while injecting said plastic molding material into said mold cavity to form in said mold cavity, at discrete positions, inserts of gas creating substances encapsulated within said plastic molding material; and,
    e) activating said gas creating substances after said molding material has filled said mold cavity so that said inserts can expand as a gas to produce internal gas filled cavities at said discrete positions within said molded article.

2. The process of claim 1 wherein said gas activating substance is activated by one of the steps consisting of a) temperature change, b) chemical reaction and c) pressure change.

3. The process of claim 2 further including the step of moving said movable half when said gas creating substance is activated.

4. The method of claim 3 wherein one of said movable mold half halves has a sealing rim maintaining said mold cavity closed when said mold cavities are moved apart to allow said gas creating substances to create said gas filled cavities within said molded article.

5. The process of claim 3 wherein said inserts are macro sized and said movement of said slide is regulated such that the molded article can have internal webs formed therein.

6. The process of claim 1 wherein said outer passages comprise an annular passage circumscribing said inner passage.

7. The method of claim 3 wherein a preform is formed at the completion of step (d) and step (e) occurs when the preform is blow molded.

8. The method of claim 1 wherein said pressurization of said molding material and said gas forming steps in said tip and said mold cavity occurs by injection molding or extrusion molding.

* * * * *

UNITED STATES PATENT AND TRADEMARK OFFICE
CERTIFICATE OF CORRECTION

PATENT NO.     : 6,875,298 B2
DATED          : April 5, 2005
INVENTOR(S)    : Georg Michael Ickinger Page 1 of 1

It is certified that error appears in the above-identified patent and that said Letters Patent is hereby corrected as shown below:

Column 10,
Line 42, change "to provide" to -- to block --.

Signed and Sealed this

Sixteenth Day of August, 2005

JON W. DUDAS
*Director of the United States Patent and Trademark Office*